(12) United States Patent
Brown et al.

(10) Patent No.: US 6,768,702 B2
(45) Date of Patent: Jul. 27, 2004

(54) BAFFLED RING DIRECTIONAL TRANSDUCERS AND ARRAYS

(76) Inventors: David A. Brown, 17 Surrey Rd., Barrington, RI (US) 02806; Boris Aronov, 22 Seabeds Way, Apt 12, Needham, MA (US) 02494

( * ) Notice: Subject to any disclaimer, the term of this patent is extended or adjusted under 35 U.S.C. 154(b) by 0 days.

(21) Appl. No.: 10/122,442

(22) Filed: Apr. 12, 2002

(65) Prior Publication Data
US 2002/0159336 A1 Oct. 31, 2002

Related U.S. Application Data

(60) Provisional application No. 60/283,905, filed on Apr. 13, 2001.

(51) Int. Cl.[7] .................................................. H04B 1/02
(52) U.S. Cl. ........................ 367/151; 367/138; 367/162
(58) Field of Search .................................. 367/162, 176, 367/165, 151, 138; 310/326, 327

(56) References Cited

U.S. PATENT DOCUMENTS 2,961,636 A * 11/1960 Benecke ...................... 367/151
4,546,459 A * 10/1985 Congdon ..................... 367/157

* cited by examiner

*Primary Examiner*—Daniel T. Pihulic

(57) ABSTRACT

The present invention relates to a directional electro-acoustic transducer and arrays of transducers of the cylindrical or ring electro-mechanical type in conjunction with a partial conformal acoustic baffle. Such a device has very desirable directional beam patterns that are nearly frequency independent over a significant frequency range and the radiation is has a characteristic broadband frequency response due to multimode excitation.

10 Claims, 4 Drawing Sheets

An illustration of a baffled cylindrical ring transducer. The baffle shown covers 180° of the cylindrical surface.

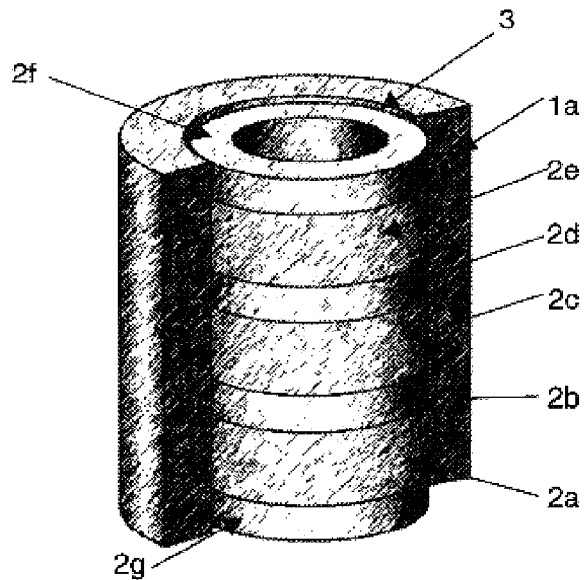
Figure 1 An illustration of a baffled cylindrical ring transducer. The baffle shown covers 180° of the cylindrical surface.
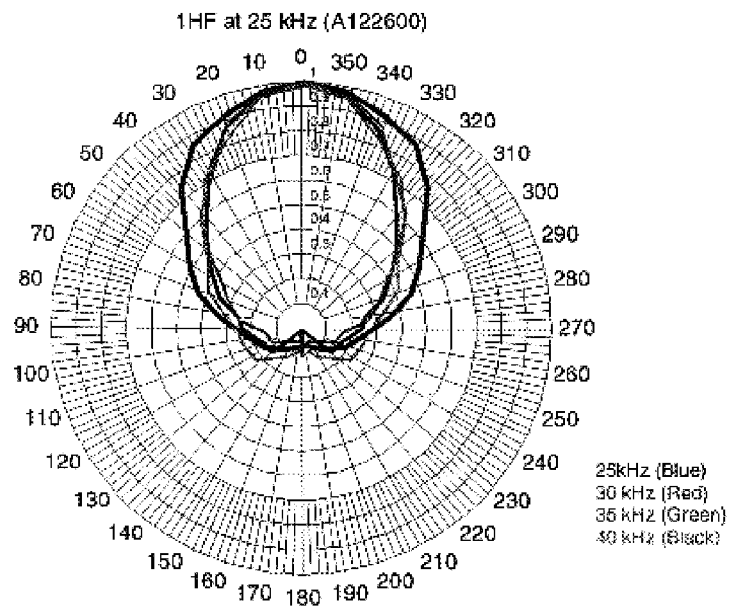
Figure 2 Acoustic beam patterns of a baffled cylindrical transducer.

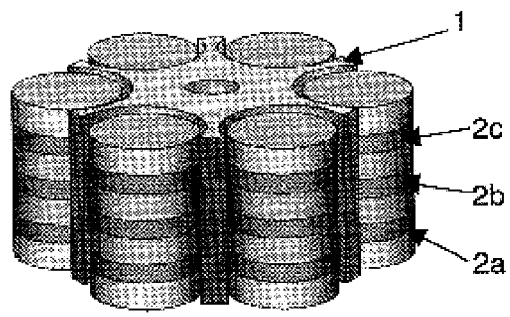
Figure 3. Illustration of a six element array of baffled cylinders. The array has been named SixPack-Stack™
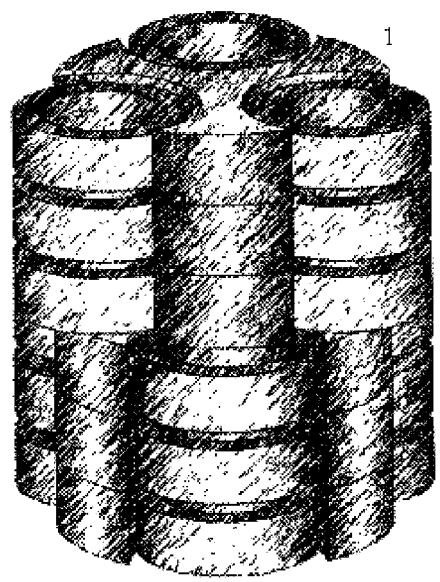
Figure 4
A 3 x 3 x 2 array or HexPack Stack™ of baffled cylindrical ring transducers.

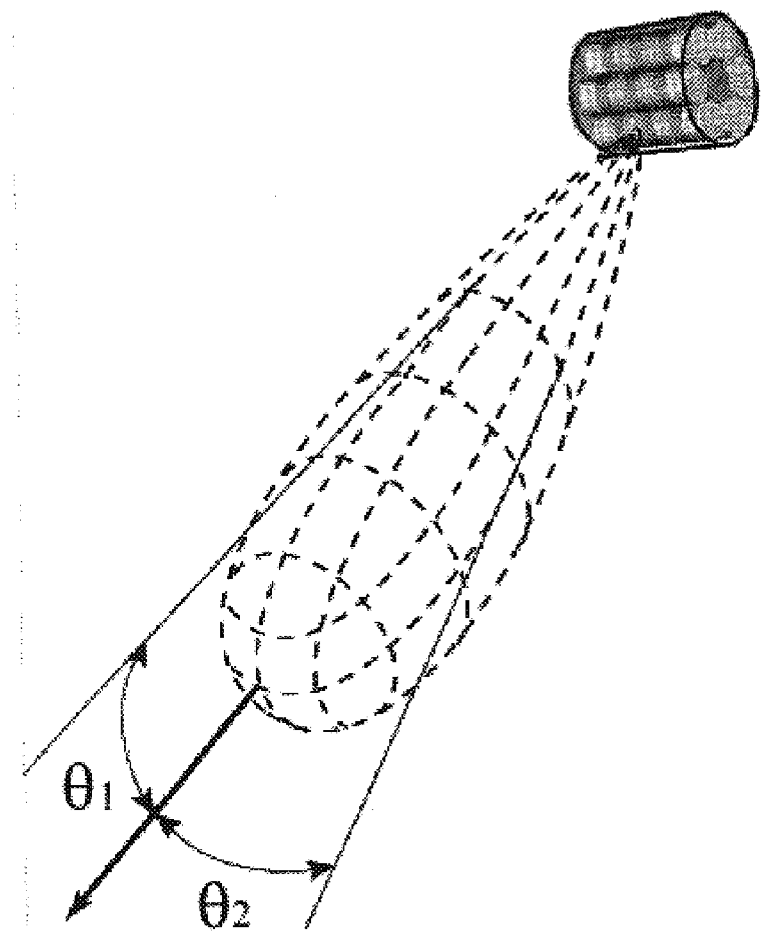
Figure 5 A self baffled array and illustration of beam pattern.
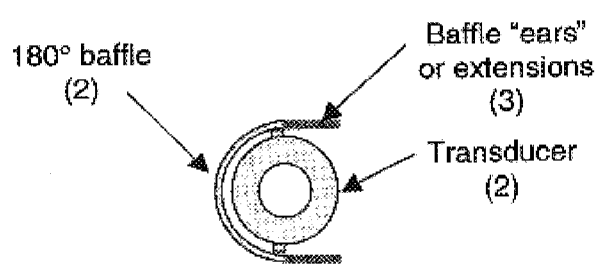
Figure 6 Illustration of baffle ears used to extend the baffling of the cylindrical transducers.

Flat package of baffled cylindrical elements.

BAFFLED RING DIRECTIONAL TRANSDUCERS AND ARRAYS

CROSS-REFERENCE TO RELATED APPLICATIONS

This application claims the benefit of Provisional application No. 60/283,905 filed Apr. 13, 2001.

STATEMENT REGARDING FEDERALLY SPONSORED RESEARCH AND DEVELOPMENT

Not Applicable.

BACKGROUND-FIELD OF INVENTION INCLUDING OBJECTS AND ADVANTAGES

This invention relates to the use of electro-mechanical and electro-acoustic transducers for the production and reception of under water sound. There is significant interested in developing directional underwater acoustic transducers for several underwater application including acoustic modem underwater communication networks, point-to-point underwater communications and in improved sonar applications. Transducers that have directionality, conserve electrical power, improved signal-to-noise ration, greater signal bandwidth, improved maximum depth operation, and/or compact size are highly desirable for both commercial and naval applications. Directional transducers permit the acoustic energy to be directed where the signal is needed and eventually will be received thereby saving limited electrical power and increasing covertness. Directionality of the radiation pattern will also result in higher signal-to-noise ratio when the transducer is used as a receiver and will enhance overall performance when the device is part of a communication or sonar network. Since the signal-to-noise ratio will be increased and the acoustic signals are not radiated in all directions, a directional transducer will reduce the probability of intercept. This is due to the simple result that acoustic radiation will be directed at a known location versus in all directions.

There are existing transducers that produce directional radiation. When the acoustic transducer dimension or acoustic aperture is sufficiently large compared to an acoustic wavelength, the radiation is directional. Arrays of transducers also produce directional acoustic radiation. However, it is desirable to use compact or small sources that produce directional radiation. Several such sources exist including electrodynamic piston sources, longitudinal vibrators (vibrating rods) and tonpilz transducers. These transducers are well established and their advantages and disadvantages are well known to those in the field.

Accordingly, it is an object of the present invention to provide and improved electro-acoustic transduction apparatus with directional radiation and reception properties.

Another object of the present invention is to combine the use of cylindrical ring electro-mechanical transducers with conforming acoustic baffles to enhance directionality and improve signal-to-noise.

Another object of the present invention is to increase acoustic bandwidth by using multi vibration modes of the subject ring electro-mechanical transducer in conjunction with the conformal acoustic baffle.

Another object of the present invention is to increase produce nearly constant beamwidth directivity radiation patterns in the fullest extent possible.

Another object of the present invention is to combine a plurality of baffled ring transducers in practical array geometry and to achieve transducer self baffled operation.

Still another object of the present invention is to use a plurality of baffled rings of different resonant frequencies as may be accomplished with different materials or different size rings but wired electrically together in series or parallel to achieve a directional acousto-mechanical transducer with improved frequency bandwidth.

Still another object of the present invention is to use a plurality of baffled transducer rings, separated by passive spacers to achieve a larger aperture with less active transduction material but wired electrically together in series or parallel to achieve a directional acousto-mechanical transducer with improved directivity in the axial direction.

Still another object of the present invention is to use a plurality of baffled transducer rings, separated by spacers which may belong to the active radiation parts of a separate transducer to achieve a compact nested or interlaced array and allow the element to element spacing to be closer than would otherwise be possible, a characteristic important in the design and operation of arrays of said transducers.

Still another object of the present invention is to use a plurality of baffled transducer rings, each having electrodes divided in such a way that electro-mechanical excitation of the zeroth mode of azimuthal ring vibration and first mode of azimuthal vibration, or combination of these modes of vibration may be realized to achieve multiband and broadband operation features.

Still another object of the present invention is to use a plurality of baffled transducer rings, where by the circumferential acoustic baffle is extended in a tangential manner to achieve further modification of the directivity pattern of the electro-acoustic transducer and further where said baffle extensions may be separate operational transducers.

Still another object of the present invention is to use a plurality of baffled transducers in an array configuration, arranged in a closely packed and equally spaced circumferential array of nominal cylindrical array geometry whereby individual transduction elements may be energized to achieve individual directive radiation patterns, and further where the directivity pattern of each transducer is so designed to cover a particular part or angular sector of the total 360 degree azimuthal coverage, and further whereby separately all of the transducers may be energized simultaneously to achieve a near omunidirectional (constant) radiation beam pattern. Several of such compact cylindrical arrays may and have been fabricated consisting of 3, 4, 5, and 6 baffled transducer separated by 120, 90, 72, and 60 degrees respectively.

SUMMARY OF THE INVENTION

To accomplish the foregoing and other objects, features and advantages of the subject invention, there is now described herein an improved directional underwater transducer primarily embodied herein as an electro-acoustic cylindrical or ring transducer in combination with a conformal acoustic baffle. The apparatus of the present invention may be used individually or with a plurality of electro-acoustic cylindrical or ring transducers together as a single electro-acoustic transducer or as an array of electro-acoustic transducers. Of particular interest in accordance with one embodiment of the subject invention is the use of electro-mechanical transducers of the piezoelectric ring type to provide a practical realization of the invention with all its advantages describe herein. The concepts of the subject invention permit fabrication and demonstration of a compact acoustic transduction device and arrays of the same.

The piezoelectric ring is baffled in such a manner with a nominal coverage of 180±40 degrees so as to produce a directional radiation that is nearly frequency independent. In the transmit mode the transducer is directional in azimuth (horizontal plane when the ring axis is configured in the vertical) with a 3 dB beamwidth that may be designed to be 30 to 100 degrees depending on the amount of acoustic baffle coverage. The baffle is so designed to fasten to the passive (not electro-mechanical) parts of the transducer while preserving a defined gap whereby a fluid or compliant material may exist in order to decrease the reradiation of acoustic energy by the acoustic baffle.

In accordance with the invention there is provide an acoustic baffle that is constructed of a suitable material, and as our research has shown, which may be realized in preferred embodiments with a) lead b) lead and polyurethane, c) syntatic foam, d) closed cell air filled foam, e) steel or other metals, f) laminate structures of composite materials, g) a thin air or air-bubble layer, h) compliant synthetic or natural rubber, or i) neighboring transducers of the piezoelectric type whereby careful attention is paid to the manner in which the baffle is connected to the electro-acoustic transducer.

DESCRIPTION OF DRAWING FIGURES

Numerous other objects, features and advantages of the invention should now become apparaten upon a reading of the following description taken in conjunction with the accompanying drawings, in which:

FIG. 1 shows a directional baffled cylindrical ring transducer comprised of three electro-mechanical rings and a conformal baffle.

FIG. 2 shows a measured acoustic radiation beam pattern on linear scale for a particular embodiment of the invention.

FIG. 3 is an illustration of a six element array of baffled cylinders transducers.

FIG. 4 is an illustration of an array of baffled ring transducers in an orientation of 3×3×2 or HexPack Stack™ array.

FIG. 5 illustrates a self baffled array of six cylindrical transducer elements.

FIG. 6 illustrates a baffled transducer with baffle extensions or ears connected to the circumferential baffle.

DETAILED DESCRIPTION

Figure 7:
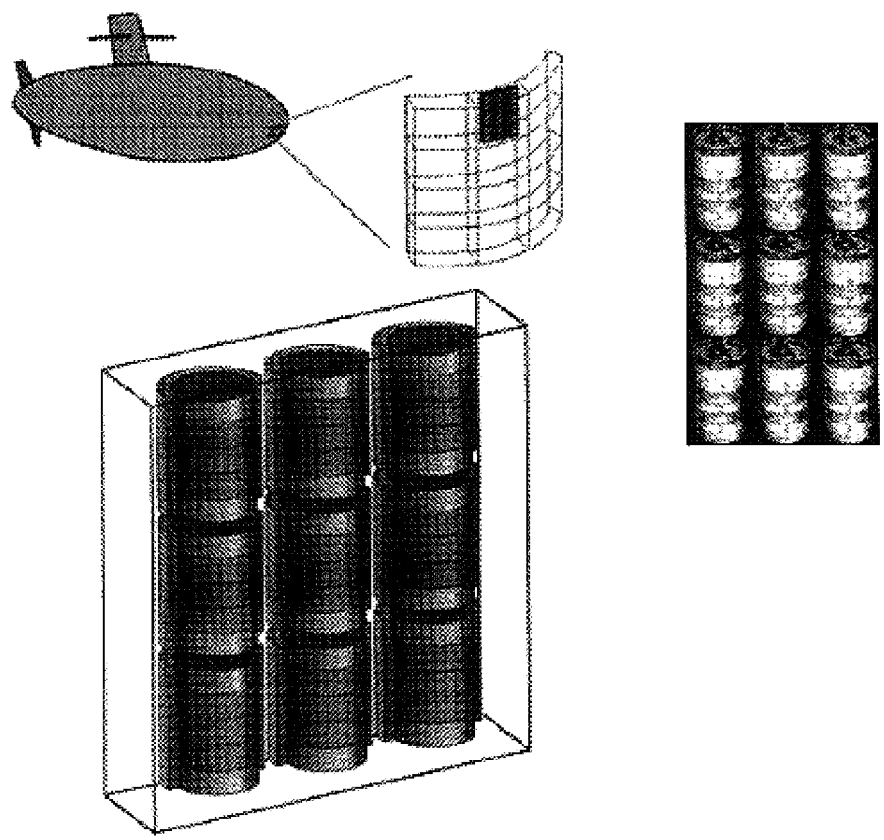
FIG. 7 shows an arrangement of baffled cylinders in planar or flat array.

In accordance with the present invention, there is now described a number of different embodiments for practicing the invention. In accordance with one aspect of the invention there is provided a conformal acoustic baffle that is placed partially around the circumference of an electro-mechanical transducer device to permit acoustic radiation in a preferred direction with said radiation having preferred directivity characteristics.

The conformal acoustic baffle hence referred to as simply as "baffle" is sufficiently spaced from said piezo-ceramic transducer to allow a gap between the transducer and the baffle in a manner so that coverage extends circumferentially leaving a sector of said piezo-ceramic ring unbaffled and exposed to the fluid it is immersed. The preferred embodiment is provided in FIG. 1.

FIG. 1 shows a directional baffled cylindrical ring transducer comprised of three electro-mechanical rings labeled 2*a*, 2*c*, and 2*e* separated by passive, non-electro-mechanical, spacers 2*b* and 2*d* and capped with passive elements 2*f* and 2*g*. The baffle labeled 1*a* surrounds the cylinder circumference in a span of nominally 180 degrees as shown however different degrees of coverage are permissible. There is a gap, labeled 3, between said cylindrical transducer and said baffle, where by fluid or compliant material is allowed to exist. The baffle is attached to the passive caps labeled 2*f* and 2*g* and when necessary to the passive rings labeled 2*d* and 2*b* but not in direct mechanical contact to the active electro-mechanical elements. The caps labeled 2*f* and 2*g* may be open as shown to allow fluid to enter the inside cavity of the electro-mechanical rings or it may be closed to form an air-tight seal so that the electro-mechanical rings operate in an air backed mode.

As evidence of the effectiveness of such an invention, FIG. 2 shows a measured acoustic radiation beam pattern on linear scale for a particular embodiment of the invention. The beam pattern is a polar plot of the pressure radiated at a particular angle so marked on the graph. There are four data curves plotted, one at 25 kHz, one at 30 kHz, one at 35 kHz and one at 40 kHz. The FIG. 2 shows that there is very little radiation from the back of the transducer labeled as 180°. The figure shows a scale whereby it may be determined that the width of the beam as measured when the main lobe is down by approximately 3 dB or a factor of 0.707 at plots corresponding to 30 kHz, 35 kHz and 40 kHz is approximately 65 angular degrees. The figure shows the beam pattern while measured in the transmit mode however this is representative of the pattern that would also be expected when the transducer is operated in the receive mode as dictated by the physical principles of reciprocity.

A plurality of baffled ring transducers may also be arranged in a horizontal, vertical or volumetric array to achieve a desired acoustical radiation pattern or multiple acoustical beams. An illustration of a six (6) element array comprised of stacks of three (3) baffled ring transducers is provided in FIG. 3. This array has 360° of coverage. This is referred to as a 6×3×1 array. It also has been named by the inventors as a SixPack Stack™. The baffle, labeled 1, is common to the six cylindrical transducers. Each transducer as shown may be comprised of a plurality of rings and spacers as was previously described in FIG. 1. The individual baffle coverage around each transducer is shown to be nominally 180°. Individual, combinations, or all of the transducers may be operated simultaneously to achieve a variety of beam patterns.

A six element array comprised of three (3) stacks of individual baffled rings may be placed above and offset from a second set of stacks of individual baffled rings to form a 3×3×2 array as illustrated in FIG. 4. The arrays may be arranged with 3, 4, 5, 6, 7 or greater elements in a circumferential manner. FIG. 4 shows an array of baffled ring transducers in an orientation of 3×3×2 or HexPack Stack™ array. In this figure, a combination of cylindrical transducers share a common baffle, labeled 1. A second combination of three transducers is arranged in a horizontally offset manner so as to achieve uniform beam coverage in the horizontal plane. The advantage over the six pack shown in FIG. 3 is that a smaller diameter array can be achieved at the expense of a greater height.

It is also possible that the neighboring transducer elements can function as baffling devices in such a manner so as to form a "self baffled" array. In this configuration the plurality of elements are placed in the horizontal plane in a closely packed configuration so as the backs of a given transducer are baffled by other transducers in the array. FIG. 5 illustrates a self baffled array of six cylindrical transducer elements. There is no separate baffle in this transducer array.

The neighboring transducer elements and a center post or cylinder is shown and form the acoustic baffle. The center post or cylinder can be used to place or to store electronics or floatation.

The beam pattern can be further modified by adding material or baffle "extensions" in between neighboring individual transducers. Such a device is depicted in FIG. 6. FIG. 6 illustrates a baffled transducer with baffle extensions or "ears" connected to the circumferential baffle. The baffle "extensions" serve to further define the acoustic radiation from the cylinder. The extensions may be of a variety of shape and may be separate functional electro-acoustic transducers. When the baffle extensions are separate functional transducers a multifunction array can easily be realized.

FIG. 7 shows an arrangement of baffled cylinders in planar or flat array. The illustration shows nine cylindrical transducers arranged in a flat rectangular package. Such sensor packs can be grouped to form array sections on the bow or hull of an underwater vehicle as illustrated.

The electrical connections of the piezoceramic transducers can be made in such a way that the "0 mode", and/or "$1^{st}$ mode" of acoustical vibration of the transducer ring may be excited and when combined with an appropriate conformal baffle having a defined coverage can produce desirable transducer operating characteristics such as, frequency independent beam patterns and beam widths and a broadband frequency response.

The excitation of the "0 mode" of vibration also referred to as the fundamental mode, also referred to as the "breathing mode" is achieved by uniform or partial electrical excitation of the ceramic ring. The excitation of the "$1^{st}$ mode" of vibration is also referred to as the "mode 1", "the dipole mode", or "the cosine mode" is achieved by partial electrical excitation of each half of the ring in antiphase. Both "0" and "1" modes may be simultaneously excited by electrical excitation of half of the ring. These 0, 1 and 0+1 modes when combined with partially baffled transducer surfaces produce very desirable beam patterns and frequency responses.

The "$2^{nd}$ mode", also known as "mode 2" also known as "quadrapole mode" may also be excited by means of partial electrical excitation of the ring and when combined with a partially baffled ring with appropriate spacing may also produce desirable characteristics Conclusion, Ramifications, and Scope Accordingly, the reader will see that the baffled cylindrical electro-mechanical transducers offer desirable transducer characteristics including directional radiation, frequency independent beams, and broadband frequency response for use in underwater sound applications.

We claim the following:

1. An underwater sound transducer comprising a vibrating member having a cylindrical surface, said vibrating member comprised of an electro-mechanical transducer; an acoustic baffle, partially surrounding said cylindrical surface of said electro-mechanical transducer; said acoustic baffle serving a function as to reduce the acoustical radiation from said electro-mechanical transducer in a particular direction, wherein said baffle can be rotated about said electro-acoustic transducer, said electro-acoustic transducer having a part of its cylindrical surface unbaffled and in contact with a surrounding fluid.

2. An underwater sound transducer comprising; a flextensional transducer, said transducer being partially surrounded with a conformal acoustic baffle, said acoustic baffle serving a function as to reduce the acoustical radiation from said electro-mechanical transducer in a particular direction, wherein said baffle is mechanically isolated from the direct mechanical vibrations of the surface of said electro-mechanical transducer.

3. An array of baffled underwater sound transducers comprised of individual circumferentially baffled transducers, where a plurality of baffled transducers are arranged in one plane so as to form a multi-element planar array of transducers, wherein the elements are spatially offset, whereby the offset distance equates to the radius of the neighboring transducer, whereby the center-to-center spacing of the elements is reduced to half of the distance when the transducers are placed side by side.

4. An underwater electro-mechanical sound transducer comprising; a vibrating member having a spherical shell, said vibrating member comprised of an electro-mechanical piezoelectric transducer; an acoustic baffle with hemispherical surface, said baffle partially surrounding and spherical surface of said electro-mechanical transducer; said acoustic baffle acting to reduce the acoustical radiation from said electro-mechanical transducer, said electro-mechanical transducer having a part of its spherical surface open to a fluid, said transducer having means for inducing vibration in its lowest and first order modes of vibration.

5. The electro-mechanical transducer set forth in claim 4, wherein said electro-mechanical transducer is comprised of a hemispherical shell of active piezoelectric material, where in the remaining hemispherical shell is comprised of passive materials having no piezoelectric properties.

6. The array of transducers set forth in claim 3, wherein the transducers can be caused to vibrate in a circumferential extensional mode of vibration, an axial extensional mode of vibration, a curcumferential flexural mode of vibration, and/or an axial flexural mode of vibration and thereby produce sound.

7. An array of cylindrical transducers whereby said transducers are arranged in a closely packed and equally spaced circumferential cylindrical array geometry, whereby individual transduction elements are energized to achieve individual directive radiation patterns, whereby individual transducers have the means to be operated to receive acoustic signals, whereby the individual transducers share a common back baffle, whereby said back baffle is centrally located in said array, whereby the neighboring transducers perform as side baffles for a particular transducer under operation, whereby the directivity pattern of each transducer covers a particular angular sector of the total 360 degree azimuthal coverage, whereby all of the transducers may be energized simultaneously to achieve a near omnidirectional radiation beam pattern, whereby three, four, five, six, seven, eight or more transducers are equally spaced circumferentially.

8. The array of cylindrical transducers set forth in claim 7, wherein the transducers can be caused to vibrate in a circumferential extensional mode of vibration, an axial extensional mode of vibration, a circumferential flexural mode of vibration, and/or an axial flexural mode of vibration and thereby produce sound.

9. An array of cylindrical transducers, whereby said transducers are arranged to be equally spaced in a circumferential cylindrical array geometry, whereby individual transduction elements are energized to achieve individual directive radiation patterns, whereby the individual transducers have the means to be operated to receive acoustical signals, whereby the individual transducers are separated by plate baffles, whereby the directivity pattern of each transducer covers a particular angular sector of the total 360 degree azimuthal coverage, whereby all of the transducers may be energized simultaneously to achieve a near omni-directional radiation beam pattern.

10. The array of transducers set forth in claim 9, wherein the transducer having the means to produce or receive acoustic signals is placed in the center of the array.

* * * * *